United States Patent [19]

Hunkeler

[11] 4,435,110
[45] Mar. 6, 1984

[54] DRIVE TRAIN FOR GEAR HOBBING MACHINE

[75] Inventor: Ernst J. Hunkeler, Fairport, N.Y.

[73] Assignee: The Gleason Works, Rochester, N.Y.

[21] Appl. No.: 323,775

[22] Filed: Nov. 23, 1981

[51] Int. Cl.³ .............................................. B23F 5/22
[52] U.S. Cl. ........................................ 409/11; 74/409
[58] Field of Search ................................ 409/11–24, 409/26; 74/409, 665 H, 665 GC, 665 GD, 665 M, 665 N

[56] References Cited

U.S. PATENT DOCUMENTS

| 2,667,818 | 2/1954 | Stewart et al. | 409/26 |
| 2,773,429 | 12/1956 | Wildhaber | 409/13 |
| 2,856,834 | 10/1958 | Berthicz | 409/21 |

FOREIGN PATENT DOCUMENTS 484928 5/1938 United Kingdom ................ 409/11

*Primary Examiner*—Z. R. Bilinsky
*Attorney, Agent, or Firm*—Ralph E. Harper

[57] ABSTRACT

A gear hobbing machine is provided with a hypoid gear set and a spur gear set for reducing the final drive to its work spindle. As a result of this arrangement, a wide range of machine speeds are available and reverse hand hobbing can be carried out.

3 Claims, 6 Drawing Figures

DRIVE TRAIN FOR GEAR HOBBING MACHINE

BACKGROUND AND BRIEF DESCRIPTION OF INVENTION

In the context of this specification, references to "hobbing" or a gear hobbing process are intended to include those machines and processes which utilize a rotating tool for engaging and forming teeth in a rotating workpiece while the tool and the workpiece are rotated together in a timed relationship. The timed relationship is critical to the formation of teeth of the right geometry and spacing about the perimeter of the workpiece, and the timed relationship is achieved with a drive train which interconnects a spindle for driving the tool with a spindle for driving the workpiece.

Hobbing machines are well known in the art and are utilized for manufacturing spur and helical gears. Typically, such machines include a tool head portion where a cylindrical hobbing tool can be mounted and rotated on its axis while the tool is brought into engagement with one or more workpieces mounted on a workpiece spindle. The workpiece spindle may be designed to carry only a single workpiece or a stack of workpieces, and the machine is provided with mechanisms for feeding the tool into engagement with the workpieces and for then traversing the tool from one end of the stack of workpieces to the other end thereof while the tool and the workpieces are rotated in a timed relationship.

Although bevel gears were used at one time in the part of the drive train that drives the workpiece about its axis (as shown, for example, in U.S. Pat. Nos. 1,543,031, 2,048,503 and 2,704,492), the hobbing machine technology has developed in more recent years to one which utilizes one or more worm drives in the final drive system for providing a rotating moment to the workpiece drive spindle. Examples of worm and wheel drives are shown in U.S. Pat. Nos. 3,232,169 and 3,318,193. The use of work drives developed out of a need for great precision in the final portion of a drive train where there is a requirement to change direction of the power train and to greatly reduce its speed for driving the work spindle of the machine. Worm and wheel drives provide such a dual function of changing direction and reducing speed in the drive train. However, worm drives are costly to manufacture to the standards of precision that are required for present day production machines, and the use of a worm drive limits the speed range available for any given machine. As a result of this, many companies in the business of manufacturing hobbing machines offer two separate lines of machines: a standard machine for use at standard speeds and a special machine with multi-lead worm and worm wheels for use at higher speeds. Alternatively, it is possible to build two separate worm drive mechanisms into a single machine, as shown for example in U.S. Pat. No. 4,286,479. In either case, a customer must invest considerable capital in order to obtain a capacity for operating over a wide range of speeds. In addition to the disadvantages just mentioned, it is also known that worm drives tend to wear excessively and create heat during normal operation. The development of excessive heat in any given area of a machine drive train creates a special problem of maintaining accuracy in the drive train and can lead to hot areas in the machine itself that tend to affect precision alignment of basic machine components which determine the precision relationship between the tool and the workpiece.

In order to provide for a greater range of speeds in a single machine than is possible with worm drives, while, at the same time, obtaining greater efficiency and stiffness in the drive train of the machine than is obtainable with worm gear drives, the present invention utilizes a hypoid gear set in combination with spur gears in the final drive system for a work spindle of a hobbing machine. The hypoid gear set functions to change the direction of the power train (from a horizontal to a vertical axis) and to partially reduce speed at the work spindle, and the spur gears function to further reduce speed at the work spindle. By separating speed reduction into two steps, it is possible to obtain a wider range of work spindle speeds with a given hypoid gear set, and the hypoid gear set does not have to be as accurate (or as costly) as is required for a worm drive of a conventional machine. Hypoid gears offer similar driving characteristics to what is obtained with worm gears because of the number of teeth which are in contact between the hypoid pinion and the hypoid gear which is being driven by the pinion. Also, hypoid drives are relatively quiet and do not create excessive heat. A hypoid drive also offers the possibility of an extended speed range for any given machine, and it is contemplated that a machine utilizing the drive of this invention will be able to operate with work spindle speeds on the order of 120 revolutions per minute or more.

There is a particular advantage in using a hypoid gear set (or even bevel gears) for reverse hand hobbing operations and for a backlash control system which utilizes a supplemental drive train in combination with the main drive train of the machine. It is possible with such a system to preload a substantial portion of the main drive train, so as to remove backlash therefrom, in accordance with the type of cutting being performed by the machine. For example, a positive preload can be used when cutting helical gears with a hobbing tool which is of opposite hand from the helix of the workpiece. Negative preload can be used when the hand of the tool and the workpiece are the same. In both cases, it is possible to effectively stiffen a substantial part of the machine drive train through the use of a supplemental drive.

In a specific embodiment of the invention, the drive train of a hobbing machine is provided with a final drive system for its work spindle characterized by the use of a hypoid pinion mounted to be rotated by a main drive train of the machine and with the hypoid pinion being in meshing engagement with a hypoid ring gear. The hypoid ring gear is operatively connected to the work spindle through an indexing spur gear set which is connected directly to the work spindle. In addition, a supplemental driving system is provided for overcoming load interruptions on the work spindle so as to remove backlash in the gears that are driving the work spindle. This combination of a final drive system utilizing a hypoid gear set with a supplemental driving system also permits an easy adaption of the machine to reverse hand hobbing operations. In addition, the hypoid drive also allows the final indexing gear to be made much larger than the rated diameter capacity of the machine which is a desirable feature.

These and other features and advantages of the invention will become apparent in the more detailed discussion which follows. In that discussion reference will be made to the accompanying drawings as briefly described below.

DETAILED DESCRIPTION OF DRAWINGS

Figure 1:
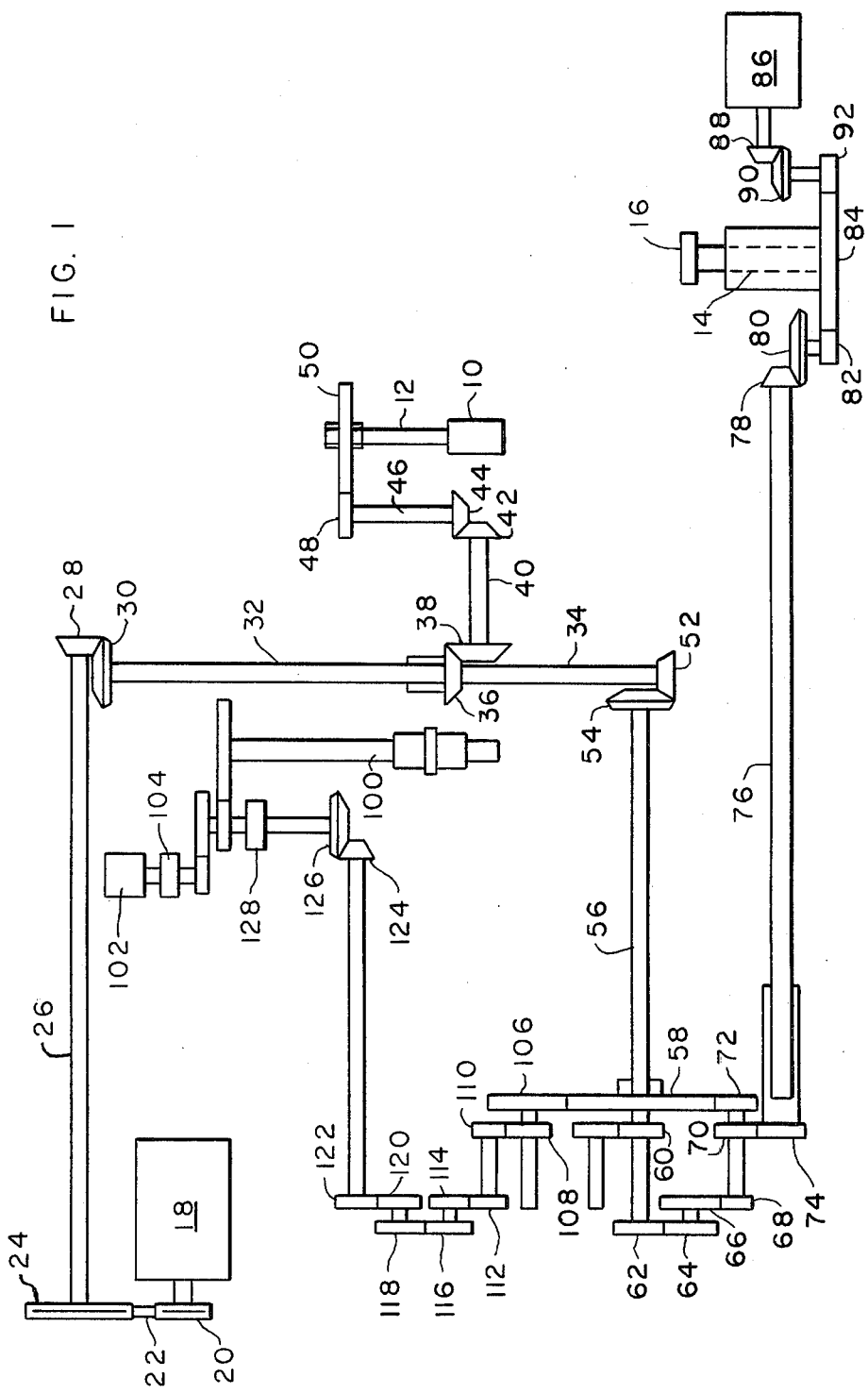
FIG. 1 is a schematic layout of a drive train for a hobbing machine utilizing a hypoid pinion and gear in a final drive system for the work spindle of the machine.
Figure 2:
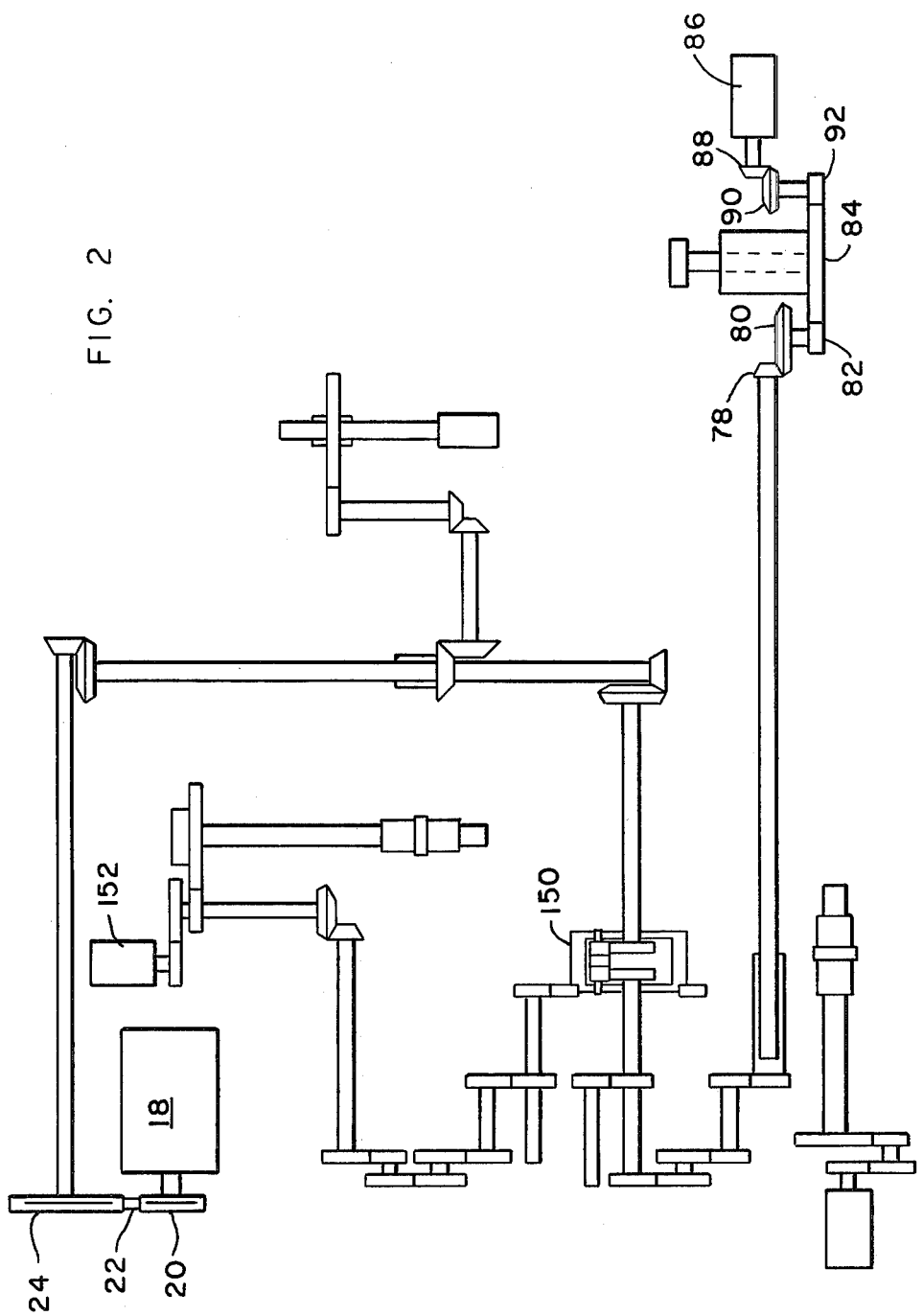
FIG. 2 is a layout similar to FIG. 1 showing a modification of the drive train to include a differential for adjusting the rate of feed of the machine during a hobbing operation.

FIGS. 1 and 2 show schematic layouts of drive trains for two different types of machines which can be assembled in accordance with the present invention. The FIG. 1 embodiment illustrates a drive train which does not include a differential assembly within the drive train. The FIG. 2 embodiment illustrates the use of a differential in the machine drive train.

Referring to FIG. 1, the layout shows a tool 10 which is in the form of a conventional hobbing tool which can be mounted on a tool spindle 12. At the other end of the drive train is a work spindle 14 which supports one or more work pieces 16 for being brought into working engagement with the hobbing tool 10. Interconnecting the hobbing tool 10 and the workpiece 16 is a relatively conventional drive train which includes a main drive motor 18. This drive motor may be, for example, a fifteen horsepower single speed AC motor. Power from the main drive motor 18 is transferred through a pulley 20 and belt 22 to another pulley 24 which is connected to a drive shaft 26. By changing the pulleys 20 and 24, rotational speed of the tool spindle 12 can be changed, and speeds in the range of 100 to 600 revolutions per minute can be provided in a typical machine in accordance with this invention. Power is transferred from the drive shaft 26 through bevel gears 28 and 30 to another drive shaft 32. The drive shaft 32 is splined to a shaft 34 so that the combined shafts 32 and 34 can telescope relative to one another to thereby adjust to the axial feed of the tool relative to a workpiece. Power is taken off from the drive shafts 32 and 34 through bevel gears 36 and 38 for delivery through a drive shaft 40, another set of gears 42 and 44, a shaft 46, and a pair of spur gears 48 and 50 which directly drive the tool spindle 12 in a manner well known in this art. Power is also taken off from the drive shaft 34 through a pair of gears 52 and 54 which transmit power to a drive shaft 56 that transmits power to a series of gears 60 through 72 for transmission to a final drive assembly. The gears 62, 64, 66 and 68 are changeable and function to determine the number of teeth to be cut in a workpiece.

The final drive assembly includes a drive shaft 76, a hypoid pinion 78, a hypoid ring gear 80, and a spur pinion 82 which drives a spur gear 84 that is directly connected to the workpiece spindle 14. It is in this final drive assembly that the use of a hypoid pinion 78 and hypoid gear 80 provide for the improved characteristics of a hobbing machine in accordance with the present invention. Typically, conventional hobbing machines have required the use of a precision worm gear system in the final drive assemblies for simultaneously changing direction and reducing speed of the power train. However, by using a hypoid gear set (made up of the pinion 78 and the gear 80), it is possible to change direction of the power train without having to reduce speed for the full amount of reduction needed at the work spindle. Final reduction of speed of the power train is provided for separately with the spur gear set (made up of the pinion 82 and the gear 84). As a result, the system can operate over a wider range of driving speeds with less wear and less heat than would be experienced with conventional drive systems. Also, the spur gear 84, which functions as an indexing gear for the work spindle, can be made with a much larger diameter than is conventional for machines utilizing worm drives, and this increases the accuracy of the final drive system.

The final drive system includes an anti-backlash system which acts upon the spur gear 84 to overcome any changes in load encountered by the interrupted cutting action of the hobbing tool with the workpiece. This can be accomplished with a known braking system or with supplemental driving system that applies a driving component to the spur gear 84 with a small high slip AC motor 86 operating through a pair of bevel gears 88 and 90 (which may be either spiral or straight bevel gears) and through a small spur gear 92. With a braking system, the gears of the final drive system are maintained in engaged positions on the driving side of each tooth. With a supplemental drive 86, it is possible to move the final drive gears to their coast sides and to then effectively "over drive" the main drive system to an extent necessary to remove backlash from a substantial portion of the main drive system. This can be accomplished through the relatively efficient hypoid drive set (or with a bevel gear set) of this invention but would not be possible with a worm drive unit in the final drive system without providing a substantial increase in power in the supplemental driving system. In this way, it is possible to remove backlash from the main drive train as cutting action takes place between the tool 10 and the workpiece 16. Preferably, the motor 86 is mounted externally of the housing which contains the work spindle assemblies so as to remove a heat source from the final drive system.

The drive train also includes a conventional provision for axially feeding the hobbing tool relative to the workpiece. This includes a feed screw 100 which is driven through a series of gears which receive power from the main drive train by way of the gears 106, 108, 110, 112, 114, 116, 118, 120, 122, 124, and 126 and a clutch 128. This provides for an adjustment of axial feed of the cutting tool as it rotates in timed relationship with a workpiece to thereby provide a desired helix angle to teeth being formed on the work-piece. When a cutting cycle has been completed, the clutch 128 is disengaged to separate the drive train from the tool, and a separate clutch 104 is then engaged to connect an AC motor 102 to drive the feed screw 100 for rapidly returning the tool to its original position for starting a new cycle.

FIG. 2 differs from FIG. 1 by its inclusion of a differential mechanism 150 within the drive train previously described for FIG. 1. Such an inclusion of a differential mechanism is well known in this art and provides for greater control in cutting helix angles on workpieces. In the FIG. 1 embodiment, it is necessary to change gears and gear ratios in order to adjust the helix angle on the workpiece. With the differential provision of FIG. 2, it is possible to adjust the helix angle through an adjustment of the rotational speed of the differential unit relative to the input shaft of the main drive. This is done with the differential change gears 151 which are driven by the D.C. motor 152. As with the previous embodiment, a hypoid gear set (made up of hypoid pinion 78 and gear 80) and a spur gear set (made up of a spur pinion 82 and a spur gear 84) are provided in the final drive assembly for the workpiece spindle.

Figure 3:
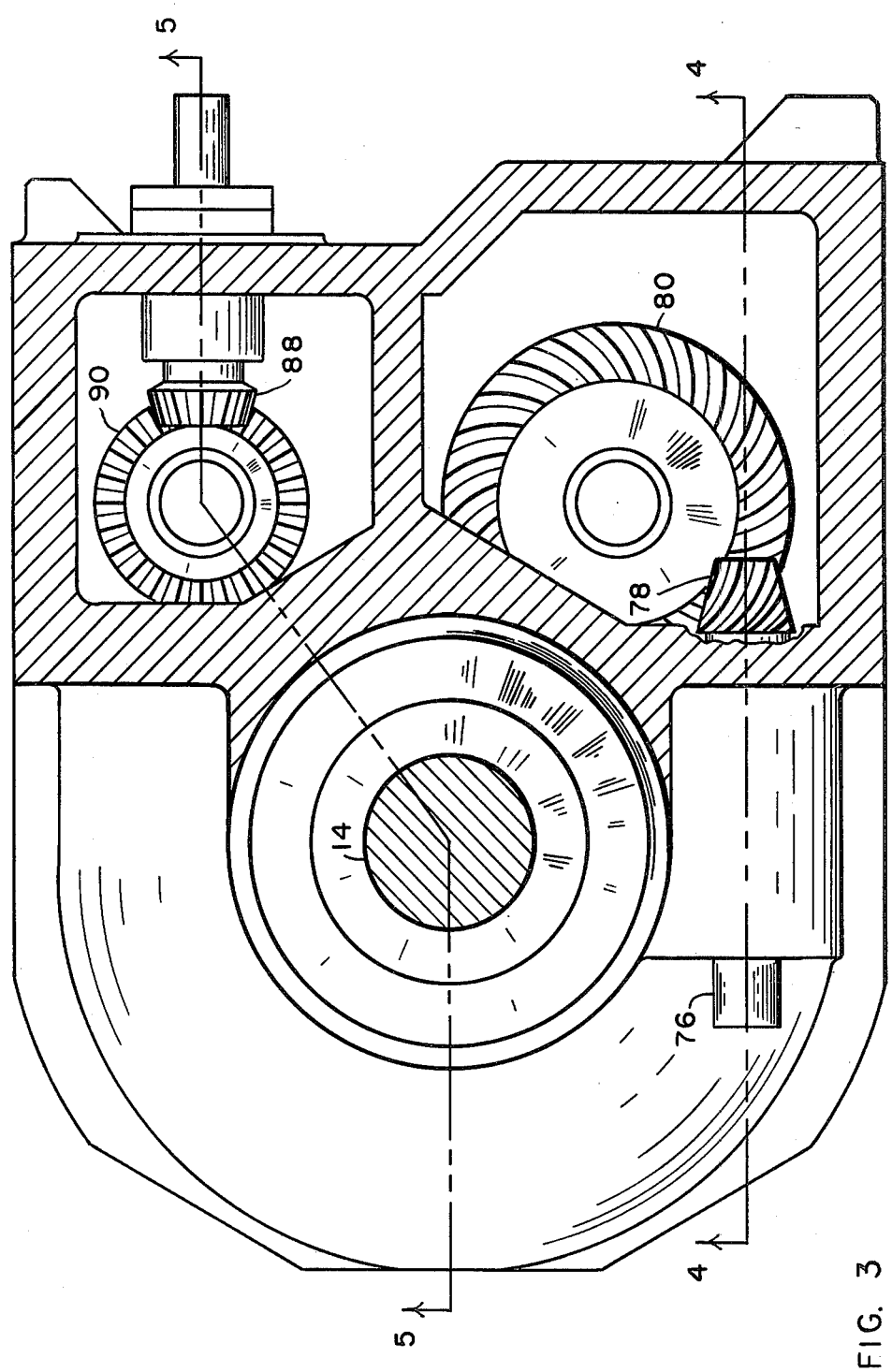
FIG. 3 is a top plan view, partly in cross-section of a final drive system for a hobbing machine assembled in accordance with the present invention.
Figure 4:
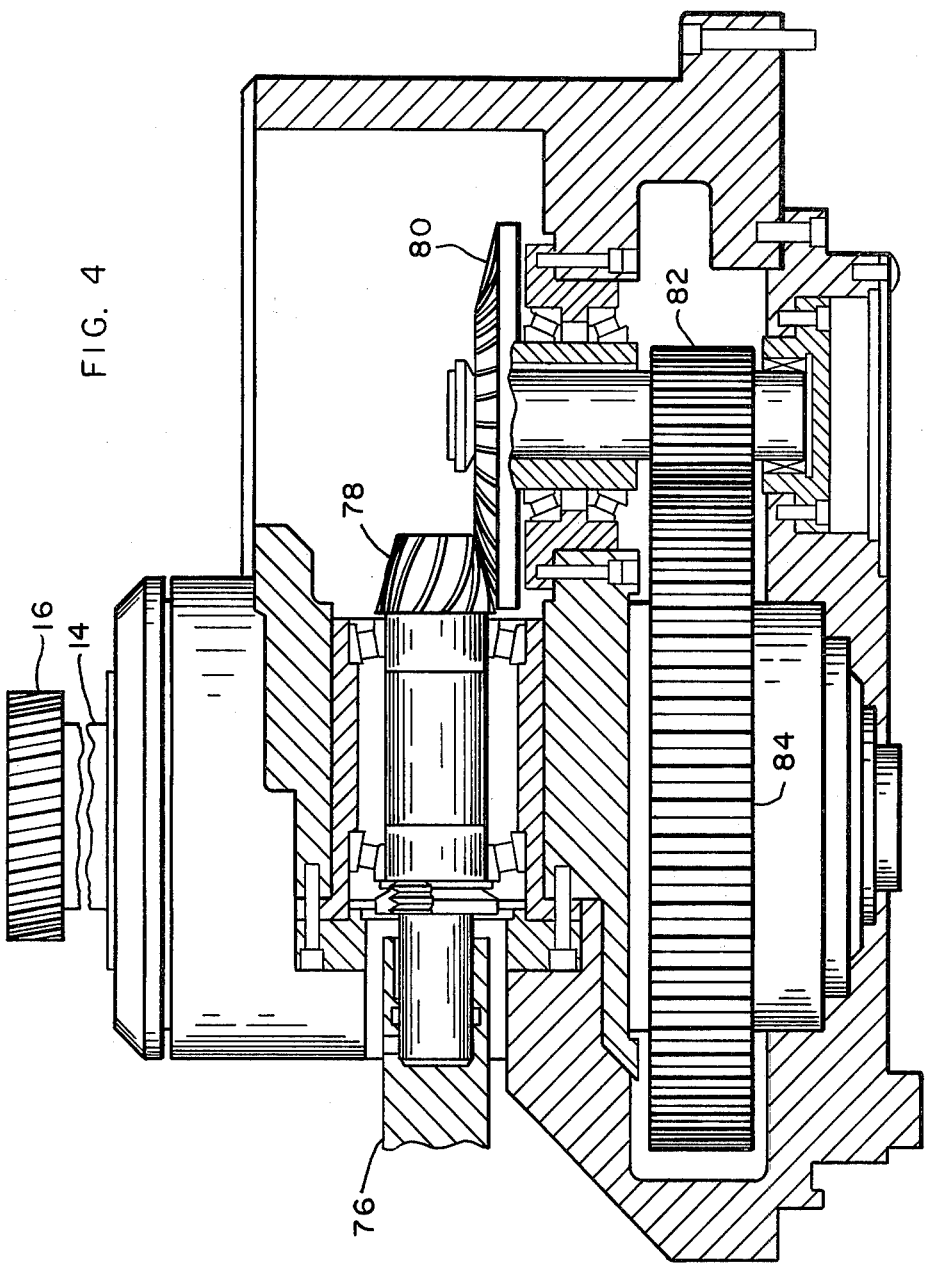
FIG. 4 is a detailed elevational view, partly in section, of a hypoid pinion and gear assembly for imparting rotational moments to a work spindle of a hobbing machine, as seen on line 4—4 of FIG. 3.

FIG. 3 is a top plan view, partly in section, of the final drive assembly for the drive train of this invention. It can be seen that the drive shaft 76 enters the final drive assembly area and is connected to the hypoid pinion 78 for driving a hypoid gear 80. The hypoid gear 80, in turn, transmits its power to a spur pinion 82 which drives a larger spur gear 84 connected to components which drive the work spindle 14. Details of this driving arrangement are shown in greater detail in FIG. 4.

Figure 5:
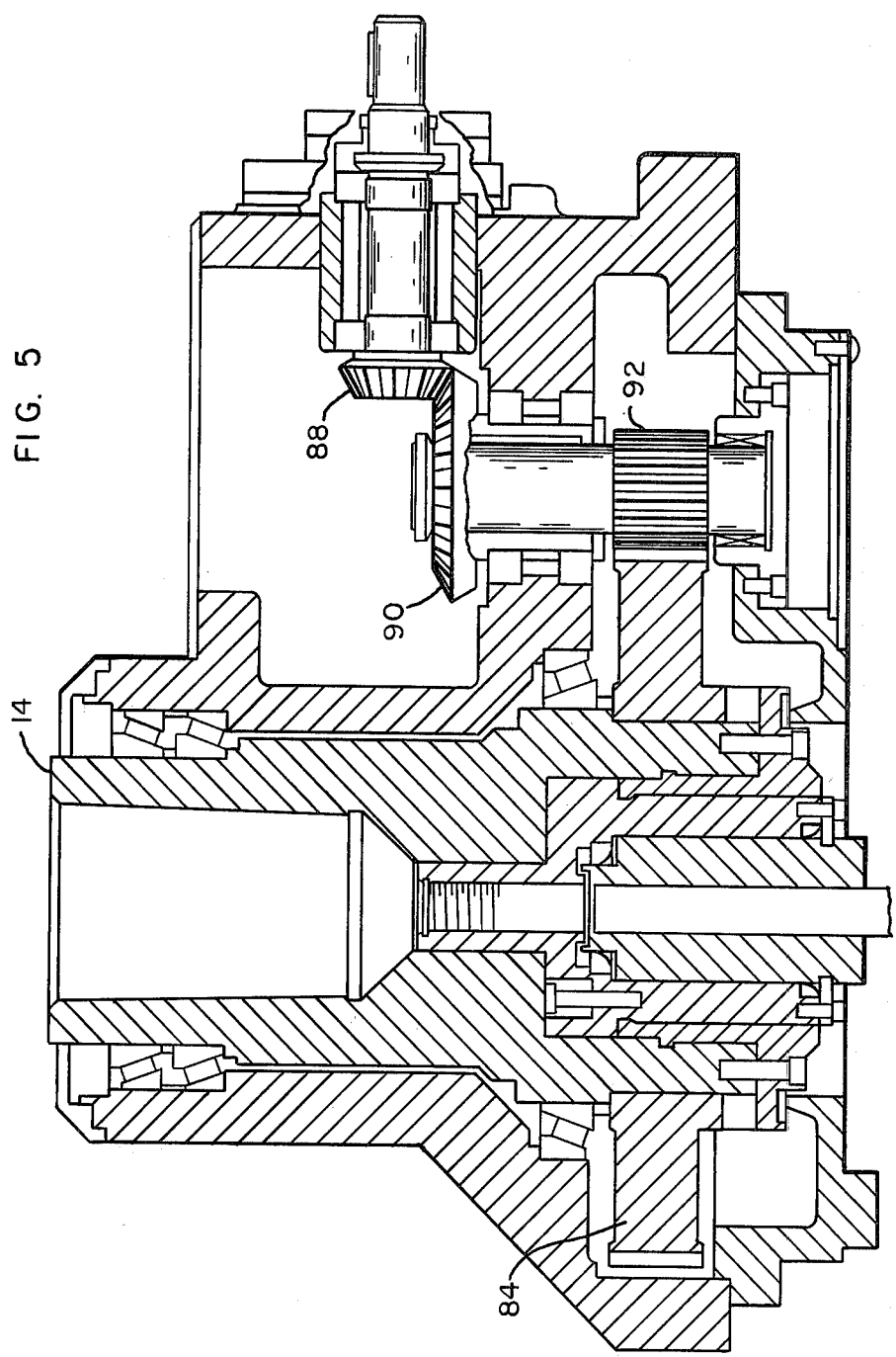
FIG. 5 is a detailed elevational view, partly in section, of a supplemental driving system used in conjunction with the final drive system of FIGS. 3 and 4, as seen on line 5—5 of FIG. 3.

FIG. 3 also shows the relative position of bevel gears 88 and 90 which receive power from an externally mounted AC motor 86 (FIGS. 1 and 2) for applying a driving component to a pinion spur 92 which likewise is in meshing engagement with the major gear 84 associated with the work spindle 14. Additional details of this arrangement are shown in FIGS. 5 and 6.

Figure 6:
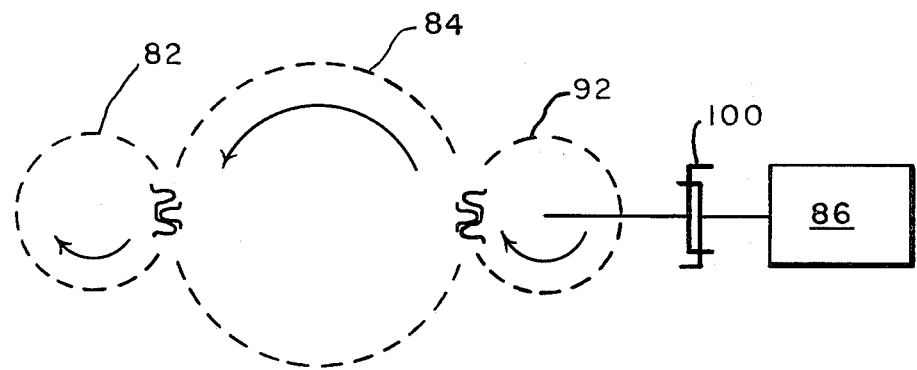
FIG. 6 is a schematic view of the supplemental driving system of FIG. 5.

As shown in FIG. 6, an optional supplemental driving system functions to apply a driving component to the work spindle gear 84 in a directin of rotation which is the same as the direction of rotation imparted to the work spindle gear 84. The AC motor 86 operates through a compliant coupling 100 (which may comprise a known elastomeric or spring coupling) for absorbing any slight differences in speed that may occur between the two driving systems. With this driving system, the supplemental drive serves primarily to drive the work spindle, while the hypoid gear set and spur 82 serve to guide the precision rotation of the work spindle. This not only eliminates backlash at the work spindle, but also provides for additional driving force that may be needed for faster metal removal rates of the tool of the machine.

What is claimed is:

1. In a hobbing machine having a drive train for imparting rotation to a work spindle while feeding and rotating a hobbing tool in timed relationship therewith, the improvement characterized by
   a final drive system for said work spindle comprising a hypoid pinion mounted to be rotated by a main drive train of the machine, said hypoid pinion being in meshing engagement with a hypoid gear,
   a spur pinion carried for rotation with said hypoid gear, said spur pinion being in meshing engagement with a spur gear which is operatively connected to said work spindle to thereby impart rotational movements to the work spindle,
   a supplemental driving system having a motor operatively connected to said work spindle for imparting rotation to said work spindle while said hypoid pinion and said hypoid gear maintain accurate positioning of said work spindle relative to said hobbing tool.

2. The improvement of claim 1 wherein said motor is connected to a bevel pinion and ring gear which, in turn, impart a driving moment to a spur pinion in meshing engagement with said spur gear connected to said work spindle.

3. In a hobbing machine having a drive train for imparting rotation to a workpiece while feeding and rotating a hobbing tool in timed relationship therewith, the improvement in said drive train characterized by
   a final drive system for said work spindle comprising a hypoid or bevel pinion mounted to be rotated by a main drive train of the machine, said hypoid or bevel pinion being in meshing engagement with a hypoid or bevel pinion being in meshing engagement with a hypoid or bevel gear, respectively for reducing the speed of said drive train to said work spindle,
   a spur pinion and a spur gear for further reducing speed of the drive train to the work spindle, said spur pinion being operatively connected between said hypoid or bevel gear and said spur gear, and said spur gear being operatively connected to said work spindle, and
   a backlash preventing system comprising a supplemental driving system which includes a motor for applying a driving moment to the final drive system.

* * * * *

UNITED STATES PATENT OFFICE
CERTIFICATE OF CORRECTION

PATENT NO. : 4,435,110
DATED : March 6, 1984
INVENTOR(S) : Ernst J. Hunkeler

It is certified that error appears in the above-identified patent and that said Letters Patent are hereby corrected as shown below:

Column 1, line 40, delete "work" and substitute --worm--;

Column 3, line 56, delete "wer" and substitute --er--;

Column 5, line 32, delete "directin" and substitute --direction--;

In Claim 3, line 9, after "hypoid or bevel", delete "pinion being in meshing engage-".

In Claim 3, line 10, delete "ment with a hypoid or bevel".

Signed and Sealed this

Twenty-fourth Day of July 1984

[SEAL]

Attest:

GERALD J. MOSSINGHOFF

Attesting Officer  Commissioner of Patents and Trademarks